US 6,616,286 B2

(12) United States Patent
Hayashi et al.

(10) Patent No.: US 6,616,286 B2
(45) Date of Patent: Sep. 9, 2003

(54) VEHICLE MIRROR ASSEMBLY

(75) Inventors: Kenichi Hayashi, Aichi-ken (JP);
Junichi Nakaho, Aichi-ken (JP);
Morihiko Ogasawara, Aichi-ken (JP);
Takashi Yamada, Aichi-ken (JP)

(73) Assignee: Kabushiki Kaisha Tokai-Rika-Denki-Seisakusho (JP)

( * ) Notice: Subject to any disclaimer, the term of this patent is extended or adjusted under 35 U.S.C. 154(b) by 0 days.

(21) Appl. No.: 10/217,470

(22) Filed: Aug. 14, 2002

(65) Prior Publication Data

US 2003/0058554 A1 Mar. 27, 2003

Related U.S. Application Data

(62) Division of application No. 09/839,361, filed on Apr. 23, 2001, now Pat. No. 6,447,129.

(30) Foreign Application Priority Data

Apr. 25, 2000 (JP) ........................................ 2000-124847

(51) Int. Cl.[7] ................................................. G02B 7/18
(52) U.S. Cl. ....................... 359/841; 359/842; 359/843; 359/871
(58) Field of Search ................................ 359/841, 842, 359/843, 871, 872; 248/475.1, 476, 477, 497

(56) References Cited

U.S. PATENT DOCUMENTS

| 4,394,066 | A | * | 7/1983 | Sharp | ........................ 248/481 |
| 5,268,797 | A | * | 12/1993 | Santo | ........................ 359/872 |
| 5,566,030 | A |   | 10/1996 | Yue |  |
| 5,610,772 | A |   | 3/1997 | Iizuka |  |
| 5,726,816 | A | * | 3/1998 | Gordon | ...................... 359/872 |
| 5,781,356 | A |   | 7/1998 | Okada et al. |  |

* cited by examiner

Primary Examiner—Mohammad Sikder
(74) Attorney, Agent, or Firm—Nixon Peabody LLP; Thomas W. Cole

(57) ABSTRACT

In a vehicle door mirror device, a bracket is divided into a frame and a case member. Thus, the frame and the like for a vehicle right side and for a vehicle left side can both hold a mirror at a vehicle rear side thereof. A mounting hole and a supporting hole of a case member are provided to be symmetrical with respect to a vertical plane which passes through a widthwise direction center of the case member. Thus, even if a common case member is used both for a vehicle right side and for a vehicle left side by left and right sides of the case member being reversed, the mounting hole of the case member can be mounted to the frame and the like for the vehicle right side and the vehicle left side.

1 Claim, 7 Drawing Sheets

VEHICLE MIRROR ASSEMBLY

BACKGROUND OF THE INVENTION

1. Field of the Invention

The present invention relates to a vehicle mirror assembly which is provided at a vehicle.

2. Description of the Related Art

A conventional vehicle door mirror device is provided with a mirror. By disposing the mirror at an extended position, a region at the rear of the vehicle can be viewed. When the mirror is rotated in one direction from the extended position, it is moved to a retracted position. When the mirror is rotated in another direction from the extended position, it is moved to a forwardly retracted position. A bracket is provided at the vehicle front side of the mirror, and a holding portion is provided at the vehicle rear side surface of the bracket. Due to the holding portion holding the mirror, the bracket holds the mirror at the vehicle rear side.

A case portion which forms a retracting mechanism is provided at the bracket, and a stand which forms the retracting mechanism is fixed to the vehicle door. The case portion is supported at the stand so as to be freely rotatable. Further, the case portion is urged toward the stand. Here, when the case portion is rotated with respect to the stand by the retracting mechanism, the mirror is rotated in one direction or another direction.

A case hill is provided at the case portion. The case hill projects towards the stand. On the other hand, a stand valley is provided at the stand. Both end portions of the stand valley project toward the case portion. Here, when the mirror is rotated from the retracted position in the other direction by the retracting mechanism, the case hill abuts one end portion of the stand valley, such that the mirror is stopped at the extended position. On the other hand, when the mirror is rotated from the extended position in the one direction by the retracting mechanism, the case hill abuts the other end portion of the stand valley, such that the mirror is stopped at the retracted position.

When the case portion receives an external force which is of a predetermined value or greater and the case hill rides up on one end portion of the stand valley, rotation of the mirror toward a forwardly retracted position is permitted. Here, a case projection is provided at the case portion. The case projection projects toward the stand. On the other hand, a stand projection is provided at the stand. The stand projection projects toward the case portion. Therefore, when the mirror is rotated toward the forwardly retracted position, the case projection abuts the stand projection such that the mirror is stopped at the forwardly retracted position.

Moreover, this vehicle door mirror device is applicable to four types of aspects which are: for a right side of a vehicle in which the steering wheel is disposed at the right side (hereinafter, "right-handle vehicle"); for a left side of a right-handle vehicle; for the right side of a vehicle in which the steering wheel is disposed at the left side (hereinafter, "left-handle vehicle"); and for the left side of left-handle vehicle.

However, in such a vehicle door mirror device, the case portion is integral with the bracket, and the holding portion can only be provided at the vehicle rear side surface of the bracket. Accordingly, for example, even if an attempt is made to "flip" (reverse) the left and right of a case portion for a vehicle right side so that it can also be used as a case portion for a vehicle left side, when the left and right sides of the case portion for the vehicle right side are reversed, the left and right sides of the bracket are also reversed integrally therewith. As a result, when a bracket for a vehicle right side is used as a bracket for a vehicle left side, the holding portion cannot be set at the vehicle rear side surface of the bracket. Accordingly, the bracket cannot hold the mirror at the vehicle rear side. In this way, a case portion for a vehicle right side cannot also be used as a case portion for a vehicle left side.

Further, the angle of rotation at the time when the mirror rotates between the extended position and the retracted position (hereinafter, the "retraction angle") and the angle of rotation when the mirror rotates between the extended position and the forwardly retracted position (hereinafter, the "forward retraction angle") are different for a mirror for a right side of right-handle vehicle and a mirror for a right side of a left-handle vehicle, and are different for a mirror for a left side of right-handle vehicle and a mirror for a left side of a left-handle vehicle. On the other hand, the positions at which the stand valley and the stand projection are disposed at the stand are the same for a stand for a right side of right-handle vehicle and a stand for a right side of a left-handle vehicle, and are the same for a stand for a left side of a right-handle vehicle and a stand for a left side of left-handle vehicle. Namely, there are only two different types of stands. As a result, there is the need to make the positions at which the case valley and the case projection are disposed different for the case portion for the right side of a right-handle vehicle and the case portion for the right side of a left-handle vehicle, and different for the case portion for the left side of a right handle vehicle and the case portion for the left side of a left-handle vehicle. Accordingly, the same case portion cannot be used in common for the case portion for the right side of a right-handle vehicle and the case portion for the right side of a left-handle vehicle, nor can the same case portion be used in common for the case portion for the left side of a right-handle vehicle and the case portion for the left side of a left-handle vehicle.

In this way, the same part cannot be commonly used for the case portion for the vehicle right side and the case portion for the vehicle left side. Similarly, the same part cannot be commonly used for the case portion for the right side of a right-handle vehicle and the case portion for the right side of a left-handle vehicle. Moreover, the same part cannot be commonly used for the case portion for the left side of a right-handle vehicle and the case portion for the left side of a left-handle vehicle. Thus, there is the need to manufacture a part to be used exclusively as each of the case portion for the right side of a right-handle vehicle, the case portion for the left side of a right-handle vehicle, the case portion for the right side of a left-handle vehicle and the case portion for the left side of a left-handle vehicle. As a result, there is the need to assemble, in an appropriate combination, one of the two types of stands and one of the four types of case portions. In this way, there are problems in that the work for assembling the case portion to the stand becomes complex (mistakes in assembling the case portion to the stand easily arise), and the assemblability of the retracting mechanism is poor.

SUMMARY OF THE INVENTION

In view of the aforementioned drawbacks, an object of the present invention is to provide a vehicle mirror assembly in which assemblability of a retracting mechanism is improved.

In order to overcome the above-described problems, a case member, relating to the present invention, which can be used in a vehicle mirror assembly including a mirror and a frame holding the mirror, comprises: a first mounting element, provided at one side of the case member, for mounting the case member to the frame; a second mounting element provided at another side of the case member; and a neutral plane positioned substantially intermediately of the one side and the other side of the case member, wherein the first and second mounting elements are substantially symmetrical with respect to the neutral plane.

In a vehicle mirror assembly relating to the present invention which includes a mirror and a bracket which holds the mirror, the bracket is formed by a frame for holding a mirror, and a case member mounted to the frame; the case member includes a first mounting element, provided at one side of the case member, for mounting the case member to the frame, a second mounting element provided at another side of the case member, and a neutral plane positioned substantially intermediately of the one side and the other side of the case member; and the first and second mounting elements are substantially symmetrical with respect to the neutral plane.

In a vehicle relating to the present invention which is equipped, at both sides of the vehicle, with a rear view mirror assembly, each mirror assembly includes a mirror and a bracket which holds the mirror, each bracket is formed by a frame for holding the mirror, and a case member mounted to the frame; and both case members are substantially the same.

DESCRIPTION OF THE PREFERRED EMBODIMENTS

Figure 1:
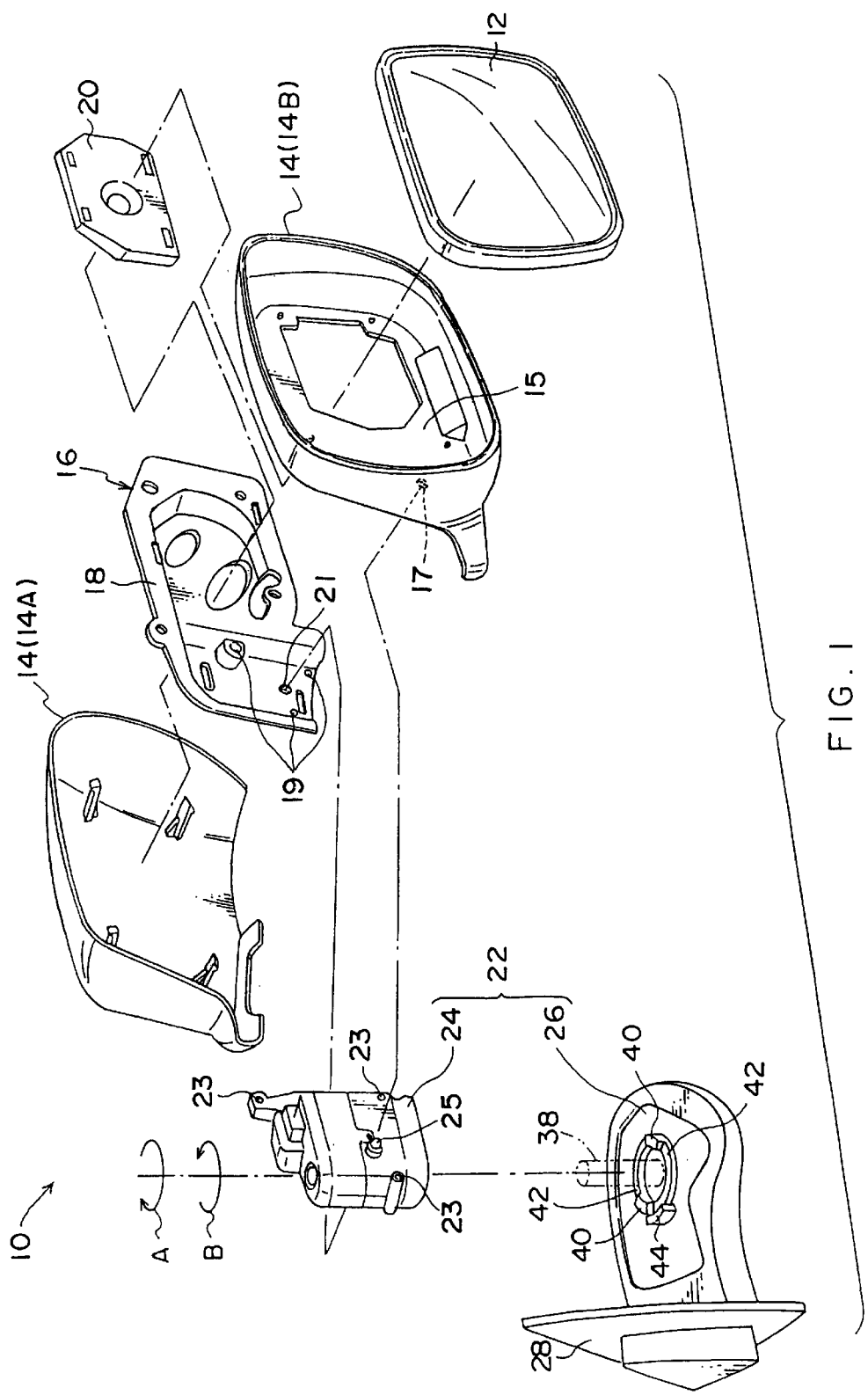
FIG. 1 is an exploded perspective view illustrating a vehicle door mirror device (for a right side of a vehicle) relating to an embodiment of the present invention.

FIG. 1 is an exploded perspective view illustrating a vehicle door mirror device 10 (for the right side of a right-handle vehicle) relating to an embodiment of the present invention.

The vehicle door mirror device 10 relating to the present embodiment is equipped with a mirror 12 for viewing a region at the rear of a vehicle. By placing the mirror 12 in an extended position, a region at the rear of the vehicle can be viewed. Further, as will be described in detail later, when the mirror 12 is rotated in one direction from the extended position, the mirror 12 is set in a retracted position. When the mirror is rotated in another direction from the extended position, the mirror is set in a forwardly retracted position.

A frame 18 which forms a bracket 16 is fixed to a vehicle front side of the mirror 12. A holding portion 20 is provided at a vehicle rear side of the frame 18. Due to the holding portion 20 holding the mirror 12, the frame 18 holds the mirror 12 at the vehicle rear side thereof. A plurality (three in the present embodiment) of screw holes 19 and a predetermined number (one in the present embodiment) of positioning holes 21 are formed in the portion of the frame 18 nearer toward the vehicle inner side. Note that the holding portion 20 cannot be mounted to the vehicle front side of the frame 18.

The vehicle front side of the mirror 12 is covered by a door mirror visor 14. The door mirror visor 14 is formed by a vehicle front side visor cover 14A and a vehicle rear side visor rim 14B being fit together. Due to the visor cover 14A being fixed to the frame 18, the door mirror visor 14 is connected to the frame 18. On the other hand, an anchor plate 15 serving as an anchor portion is provided at the visor rim 14B. The anchor plate 15 is disposed at the side of a case member 24 opposite the side at which the frame 18 is located. In a state in which the holding portion 20 is exposed, the anchor plate 15 covers the frame 18. A predetermined number (one in the present embodiment) of anchor holes 17 are formed in the anchor plate 15.

The vehicle door mirror device 10 is provided with a retracting mechanism 22. The retracting mechanism 22 has the case member 24 which forms the bracket 16. The bracket 16 is formed by the case member 24 and the frame 18. The retracting mechanism 22 has a stand 26. The stand 26 is fixed to a door mirror stay 28 provided at a door (not shown) of the vehicle.

A predetermined number of mounting holes 23 serving as mounting portions are formed in the case member 24 in correspondence with the screw holes 19. (In the present embodiment, there are a total of three mounting holes 23: two provided at the side surface bottom side of the case member 24, and one provided at the side surface upper side of the case member 24.) Each of the mounting holes 23 passes through the case member 24 along the widthwise direction thereof. As a result, the mounting holes 23 are provided so as to be symmetrical with respect to plane H (refer to FIG. 2). (Plane H is a plane (hereinafter, "vertical plane") which is substantially parallel to the frame 18 and passes through a widthwise direction center of the base member 24.) (The vertical plane H divides the respective mounting holes 23 at the centers thereof.) A screw (not shown) is inserted through each mounting hole 23. By fixing the screws in the respective screw holes 19, the case member 24 is mounted to the frame 18. Further, a pair of positioning projections 25, which serve as positioning portions, are provided at the case member 24 in correspondence with the positioning hole 21 and the anchor hole 17. The pair of positioning projections 25 are provided symmetrically with respect to the vertical plane H, and project from side walls of the case member 24. One of the positioning projections 25 is inserted into the positioning hole 21, and as a result, the case member 24 is positioned at the frame 18. Moreover, the other positioning projection 25 is inserted in the anchor hole 17, and as a result, the case member 24 is positioned at the anchor plate 15 of the door mirror visor 14.

Figure 2:
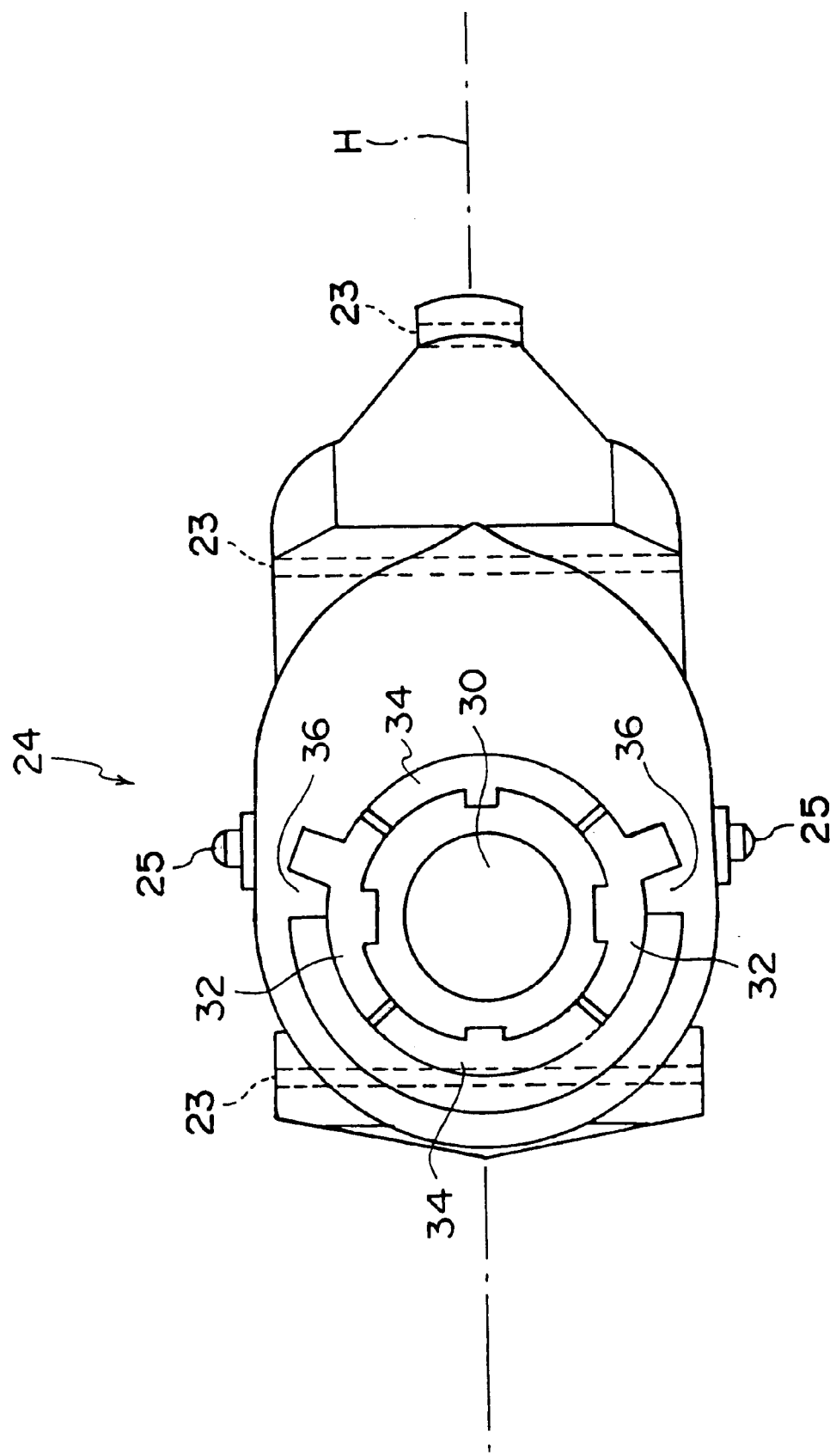
FIG. 2 is a reverse surface view illustrating a case member.

As shown in FIG. 2, a supporting hole 30 serving as a supporting portion is formed in the case member 24. The supporting hole 30 opens from the bottom surface of the case member 24, and is provided to be symmetrical with respect to the vertical plane H (i.e., the vertical plane H divides the supporting hole 30 at the center thereof.)

A pair of case hills 32 and a pair of case valleys 34 are provided at the periphery of the supporting hole 30 at the bottom surface of the case member 24. The supporting hole 30 is surrounded circularly by the pair of case hills 32 and the pair of case valleys 34. The pair of case hills 32 oppose one another, and the pair of case valleys 34 oppose one another. The pair of case hills 32 and the pair of case valleys 34 are provided symmetrically with respect to the vertical plane H. Further, each case valley 32 projects trapezoidally toward the stand 26 (toward the bottom of the vehicle) with respect to the case valley 34.

A pair of case projections 36 are provided at the outer peripheries of the case hills 32. (The case projections 36 may be provided at the outer peripheries of the case valleys 34.) The pair of case projections 36 are provided symmetrically with respect to the vertical plane H. The case projections 36 project further toward the stand 26 (toward the bottom of the vehicle) than the case hills 32.

Figure 3:
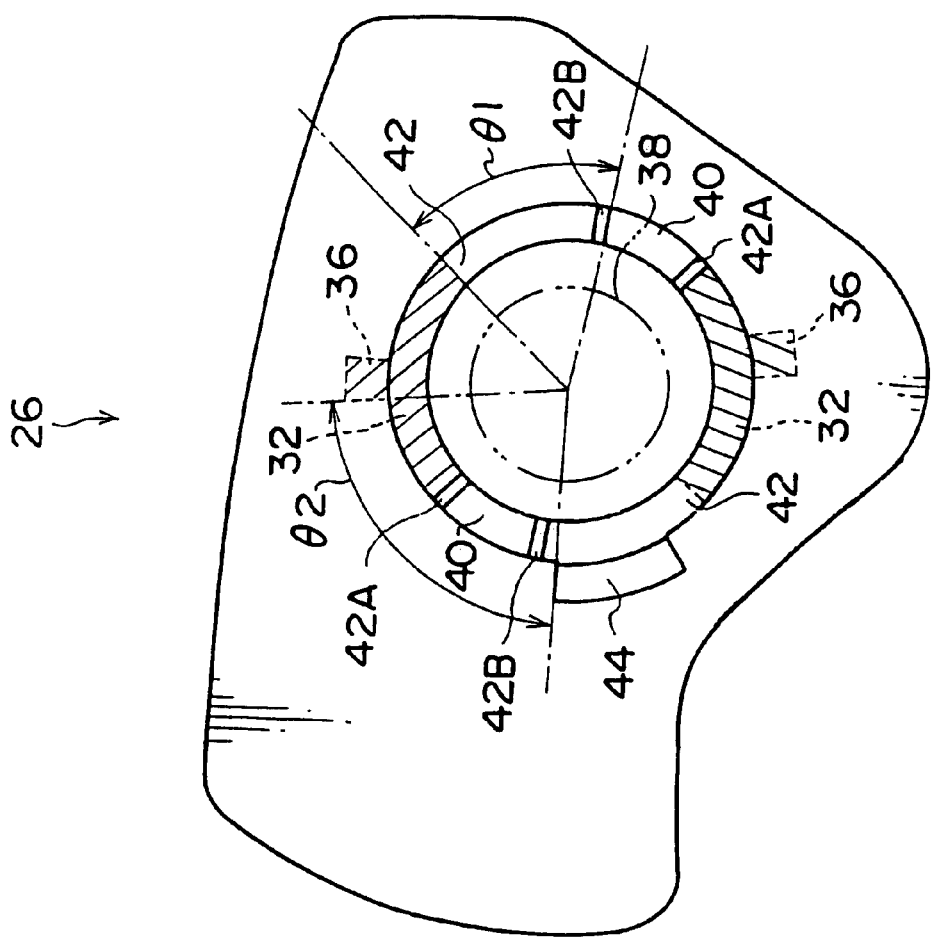
FIG. 3 is a plan view illustrating a stand for a right side of a right-handle vehicle.

As shown in detail in FIG. 3, a supporting shaft 38 is provided at the stand 26 and projects toward the top of the vehicle. Due to the supporting shaft 38 being inserted into the supporting hole 30, the case member 24 is rotatably supported at the stand 26. As a result, the door mirror stay 28 rotatably supports the mirror 12 and the door mirror visor 14 via the stand 26 and the bracket 16. Moreover, the case member 24 is urged toward the stand 26. Here, due to the case member 24 being rotated with respect to the stand 26 by the retracting mechanism 22, the frame 18 is rotated with respect to the stand 26. In this way, the mirror 12 and the door mirror visor 14 are rotated in one direction (the direction of arrow A) or in another direction (the direction of arrow B) with respect to the door mirror stay 28.

A pair of stand hills 40 and a pair of stand valleys 42 are provided at the stand 26 at the periphery of the supporting shaft 38. The supporting shaft 36 is surrounded circularly by the pair of stand hills 40 and the pair of stand valleys 42. The pair of stand hills 40 oppose one another, and the pair of stand valleys 42 oppose one another. The stand hills 40 project toward the case member 24 (toward the upper side of the vehicle) with respect to the stand valleys 42. In this way, both end portions of the stand valley 42 (i.e., one end portion 42A and another end portion 42B) project toward the case member 24 (toward the upper side of the vehicle), and the stand valley 42 has a trapezoidally hollowed configuration. Moreover, the stand hills 40 and the stand valleys 42 correspond to the extended position and the retracted position of the mirror 12 and to the case hills 32.

A stand projection 44 is provided at the outer periphery of the stand valley 42. (The stand projection 44 may be provided at the outer periphery of the stand hill 40.) The stand projection 44 projects further toward the case member 24 (toward the upper side of the vehicle) than the stand hills 40. The stand projection 44 corresponds to the forwardly retracted position of the mirror 12 and to the case projections 36.

Here, in the state in which the mirror 12 is disposed at the extended position, one end portion of the case hill 32 abuts the one end portion 42A of the stand valley 42. When the mirror 12 is rotated in one direction from the extended position by the retracting mechanism 22 as described above, the other end portion of the case hill 32 abuts the other end portion 42B of the stand valley 42, such that the mirror 12 is stopped at the retracted position. On the other hand, when the mirror 12 is rotated from the retracted position in the other direction by the retracting mechanism 22 as described above, the one end portion of the case hill 32 abuts the one end portion 42A of the stand valley 42, such that the mirror 12 is stopped at the extended position. Further, at the vehicle door mirror device 10 (for the right side of a right-handle vehicle), the angle of rotation (retraction angle) at the time the mirror 12 is rotated between the extended position and the retracted position is θ1 in FIG. 3. When the case member 24 receives an external force of a predetermined value or greater in the other direction due to the door mirror visor 14 receiving an external force, the case hill 32 rides up on the one end portion 42A of the stand valley 42, and rotation of the mirror 12 toward the forwardly retracted position is thereby permitted. Moreover, when the mirror 12 is rotated toward the forwardly retracted position, due to the case projection 36 abutting the stand projection 44, the mirror 12 is stopped at the forwardly retracted position. Further, in the vehicle door mirror device 10 (for the right side of a right-handle vehicle), the angle of rotation (forward retraction angle) at the time the mirror 12 is rotated between the extended position and the forwardly retracted position is θ2 in FIG. 3.

Figure 4:
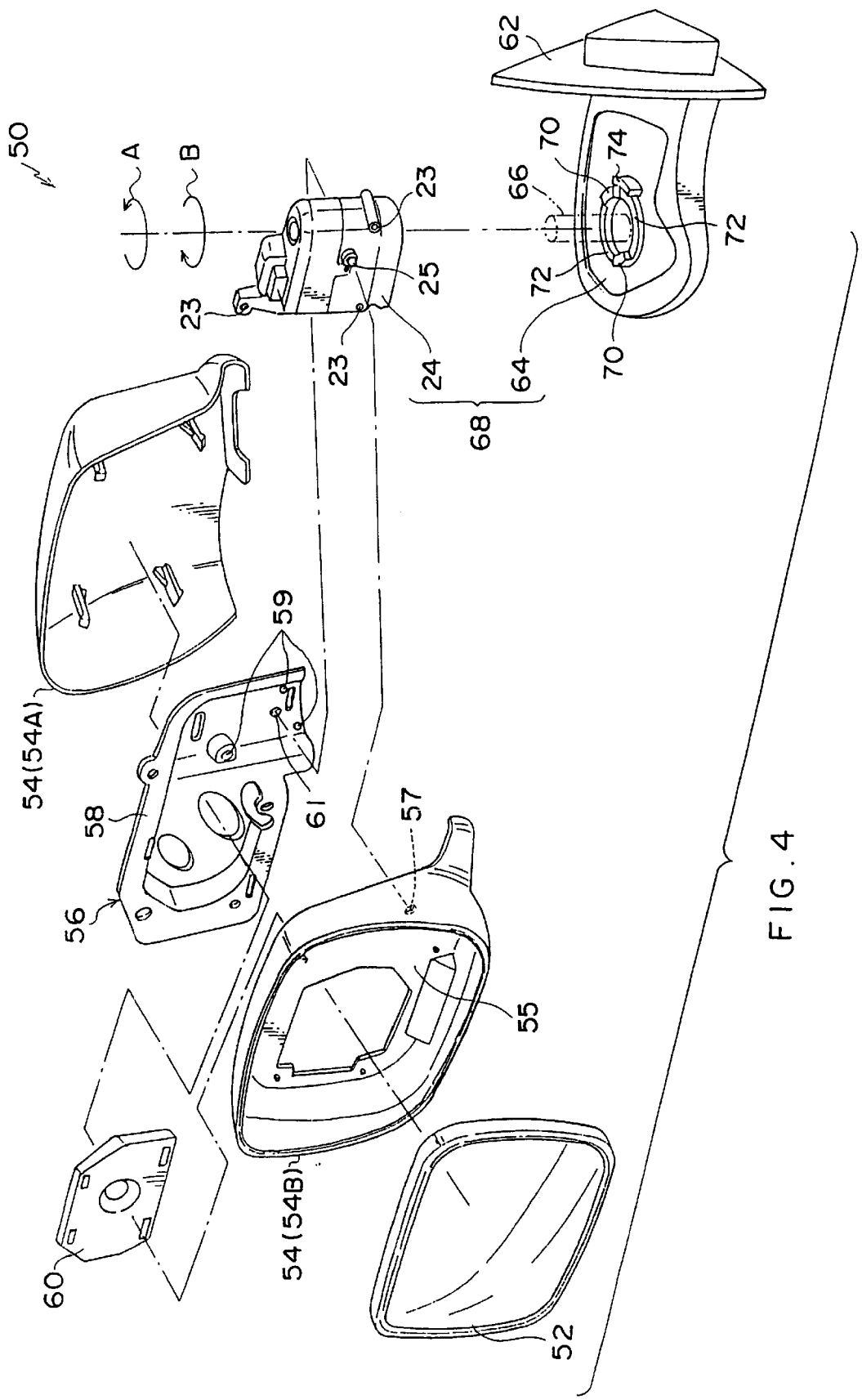
FIG. 4 is an exploded perspective view illustrating a vehicle door mirror device (for a left side of a vehicle) relating to an embodiment of the present invention.

FIG. 4 is an exploded perspective view of a vehicle door mirror device 50 (for the left side of a right-handle vehicle) relating to an embodiment of the present invention.

In the vehicle door mirror device 50, a mirror 52, a door mirror visor 54 (a visor cover 54A and a visor rim 54B (including an anchor plate 55 and an anchor hole 57)), a frame 58 (including screw holes 59 and a positioning hole 61) and a holding portion 60 of a bracket 56, a door mirror stay 62, and a supporting shaft 66 of a stand 64 are structured so as to be symmetrical, to the left and right, with respect to the structures, in the above-described vehicle door mirror device 10 (for a right side of a right-handle vehicle) of the mirror 12, the door mirror visor 14 (the visor cover 14A and the visor rim 14B (including the anchor plate 15 and the anchor hole 17)), the frame 18 (including the screw holes 19 and the positioning hole 21) and the holding portion 20 of the bracket 16, the door mirror stay 28, and the supporting shaft 38 of the stand 26.

The case member 24 of a retracting mechanism 68 in the vehicle door mirror device 50 is the same as the case member 24 of the vehicle door mirror device 10, but in the vehicle door mirror device 50, the case member 24 is used with the left and right thereof being reversed from the case in which it is used in the vehicle door mirror device 10. Here, in the same way as described above, the mounting holes 23 of the case member 24 are provided so as to be symmetrical with respect to the vertical plane H. Thus, the case member 24 is mounted at the mounting holes 23 by the aforementioned screws to the screw holes 59 of the frame 58. Moreover, the pair of positioning projections 25 of the case member 24 are provided symmetrically with respect to the vertical plane H. Thus, the pair of positioning projections 25 are inserted into the positioning hole 61 of the frame 58 and the anchor hole 57 of the anchor plate 55 such that the case member 24 is positioned at the frame 58 and the anchor plate 55. Moreover, because the supporting hole 30 of the case member 24 is provided so as to be symmetrical with respect to the vertical plane H, the case member 24 is rotatably supported at the supporting hole 30 by the supporting shaft 66 of the stand 64.

The pair of case hills 32, the pair of case valleys 34 and the pair of case projections 36 of the case member 24 are all provided symmetrically with respect to the vertical plane H. Thus, the case hills 32, the case valleys 34 and the case projections 36 of the vehicle door mirror device 10, and the case hills 32, the case valleys 34 and the case projections 36 of the vehicle door mirror device 50, are disposed at positions which are substantially symmetrical to the left and the right.

Figure 5:
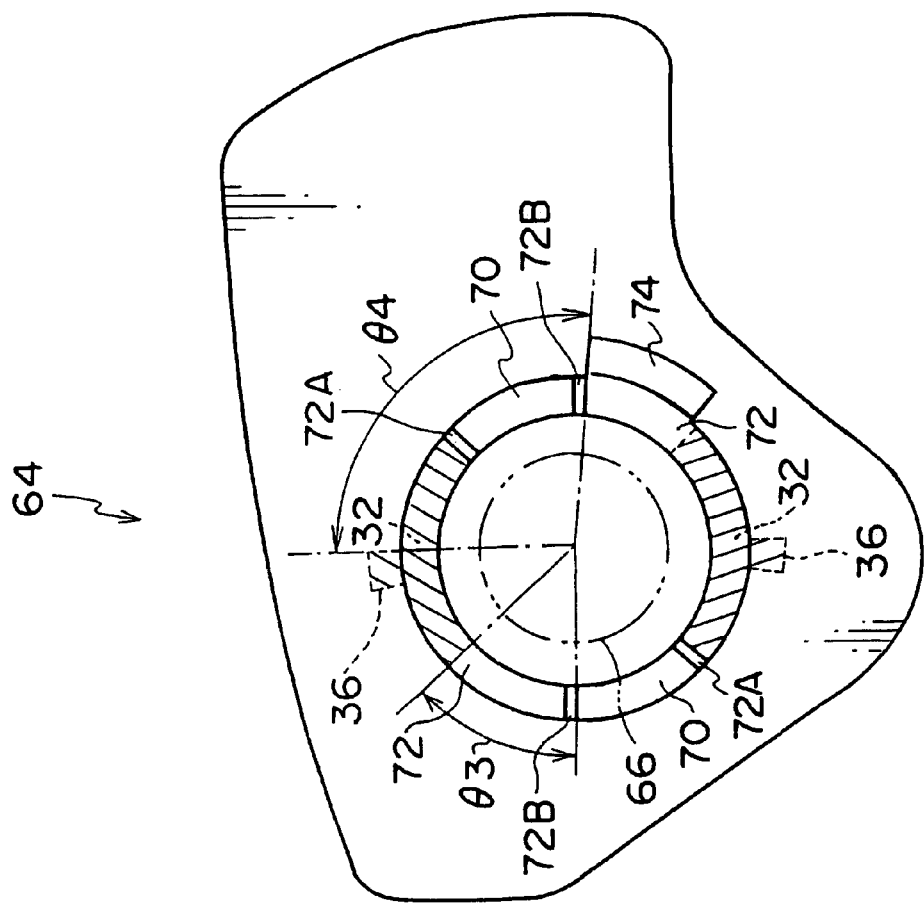
FIG. 5 is a plan view illustrating a stand for a left side of a right-handle vehicle.

As is illustrated in detail in FIG. 5, the retraction angle (θ3 in FIG. 5) and the forward retraction angle (θ4 in FIG. 5) at the vehicle door mirror device 50 are respectively different than the retraction angle (θ1 in FIG. 3) and the forward retraction angle (θ2 in FIG. 3) at the vehicle door mirror device 10 (for the right side of a right-handle vehicle). (Namely, θ3<θ1 and θ4>2.) Thus, at the stand 64 of the vehicle door mirror device 50, a pair of stand hills 70 and a pair of stand valleys 72 (each including one end portion 72A and another end portion 72B) are provided so as to correspond to the extended position and the retracted position of the mirror 52 for the left side of a right-handle vehicle, and to the case hills 32. Further, at the stand 64 of the vehicle door mirror device 50, a stand projection 74 is provided so as to correspond to the forwardly retracted position of the mirror 52 for the left side of a right-handle vehicle, and to the case projections 36.

Figure 6:
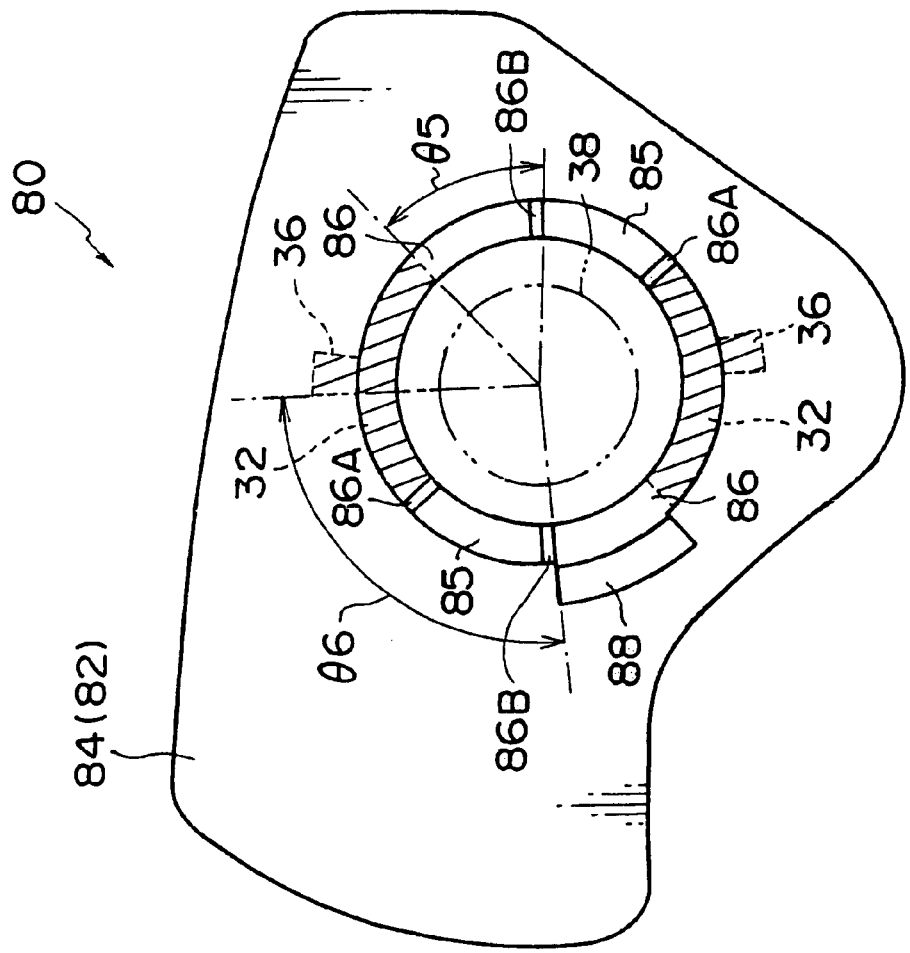
FIG. 6 is a plan view illustrating a stand for a right side of a left-handle vehicle.

In FIG. 6, main portions of a vehicle door mirror 80 (for a right side of a left-handle vehicle) relating to the embodiment of the present invention are illustrated in plan view.

The vehicle door mirror device 80 is provided with the mirror 12, the door mirror visor 14 (the visor cover 14A and the visor rim 14B (including the anchor plate 15 and the anchor hole 17)), the frame 18 (including the screw holes 19 and the positioning hole 21) and the holding portion 20 of the bracket 16, the door mirror stay 28, the case member 24 of a retracting mechanism 82 and the supporting shaft 38 of a stand 84, which have the same structures as in the above-described vehicle door mirror device 10 (for the right side of a right-handle vehicle).

As illustrated in FIG. 6, the retraction angle (θ5 in FIG. 6) and the forward retraction angle (θ6 in FIG. 6) at the vehicle door mirror device 80 are respectively different than the retraction angle (θ1 in FIG. 3) and the forward retraction angle (θ2 in FIG. 3) at the vehicle door mirror device 10 (for the right side of a right-handle vehicle). (Namely, θ5<θ1 and θ6>θ2.) Thus, at the stand 84 of the vehicle door mirror device 80, a pair of stand hills 85 and a pair of stand valleys 86 (each including one end portion 86A and another end portion 86B) are provided so as to correspond to the extended position and the retracted position of the mirror 12 for the right side of a left-handle vehicle, and to the case hills 32. Further, at the stand 84 of the vehicle door mirror device 80, a stand projection 88 is provided so as to correspond to the forwardly retracted position of the mirror 12 for the right side of a left-handle vehicle, and to the case projections 36.

Figure 7:
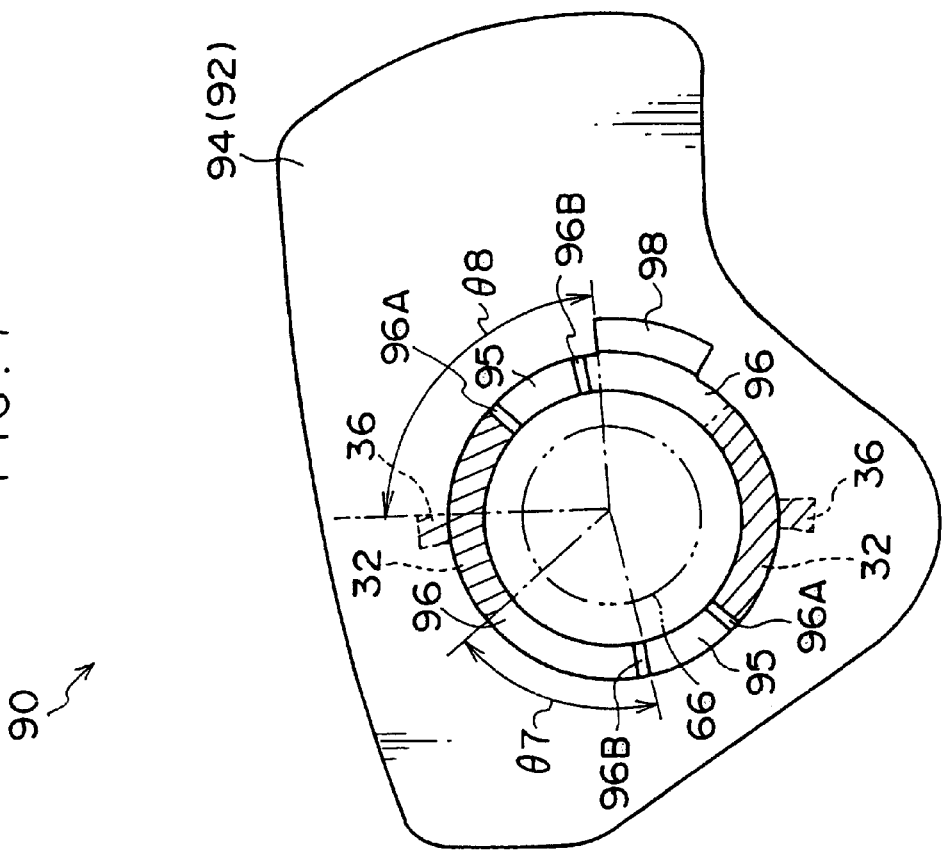
FIG. 7 is a plan view illustrating a stand for a left side of a left-handle vehicle.

In FIG. 7, main portions of a vehicle door mirror 90 (for a left side of a left-handle vehicle) relating to the embodiment of the present invention are illustrated in plan view.

The vehicle door mirror device 90 is provided with the mirror 52, the door mirror visor 54 (the visor cover 54A and the visor rim 54B (including the anchor plate 55 and the anchor hole 57)), the frame 58 (including the screw holes 59 and the positioning hole 61) and the holding portion 60 of the bracket 56, the door mirror stay 62, the case member 24 of a retracting mechanism 92 and the supporting shaft 66 of a stand 94, which have the same structures as in the above-described vehicle door mirror device 50 (for the left side of a right-handle vehicle). Thus, the mirror 52, the door mirror visor 54 (the visor cover 54A and the visor rim 54B (including the anchor plate 55 and the anchor hole 57)), the frame 58 (including the screw holes 59 and the positioning hole 61) and the holding portion 60 of the bracket 56, the door mirror stay 62, and the supporting shaft 66 of the stand 94 in the vehicle door mirror device 90, are structured so as to be symmetrical to the left and the right to the structures of the above-described vehicle door mirror device 80 (for the right side of a left-handle vehicle) of the mirror 12, the door visor 14 (the visor cover 14A and the visor rim 14B (including the anchor plate 15 and the anchor hole 17)), the frame 18 (including the screw holes 19 and the positioning hole 21) and the holding portion 20 of the bracket 16, the door mirror stay 28, and the supporting shaft 38 of the stand 84.

Further, the case member 24 of the retracting mechanism 92 in the vehicle door mirror device 90 is the same as the case member 24 of the vehicle door mirror device 80, but in the vehicle door mirror device 90, the case member 24 is used with the left and right thereof being reversed from the case in which it is used in the vehicle door mirror device 80. Here, in the same way as described above, the mounting holes 23 of the case member 24 are provided to be symmetrical with respect to the vertical plane H. Thus, the case member 24 is mounted at the mounting holes 23 by the aforementioned screws to the screw holes 59 of the frame 58. Moreover, the pair of positioning projections 25 of the case member 24 are provided symmetrically with respect to the vertical plane H. Thus, the pair of positioning projections 25 are inserted into the positioning hole 61 of the frame 58 and the anchor hole 57 of the anchor plate 55 such that the case member 24 is positioned at the frame 58 and the anchor plate 55. Moreover, because the supporting hole 30 of the case member 24 is positioned to be symmetrical with respect to the vertical plane H, the case member 24 is rotatably supported at the supporting hole 30 by the supporting shaft 66 of the stand 64.

The pair of case hills 32, the pair of case valleys 34 and the pair of case projections 36 of the case member 24 are all provided symmetrically with respect to the vertical plane H. Thus, the case hills 32, the case valleys 34 and the case projections 36 of the vehicle door mirror device 80, and the case hills 32, the case valleys 34 and the case projections 36 of the vehicle door mirror device 90, are disposed at positions which are substantially symmetrical to the left and the right.

As illustrated in FIG. 7, the retraction angle (θ7 in FIG. 7) and the forward retraction angle (θ8 in FIG. 7) at the vehicle door mirror device 90 are respectively different than the retraction angle (θ3 in FIG. 5) and the forward retraction angle (θ4 in FIG. 5) at the vehicle door mirror device 50 (for the left side of a right-handle vehicle). (Namely, θ7>θ3 and θ8<θ4.) Moreover, the retraction angle (θ7 in FIG. 7) and the forward retraction angle (θ8 in FIG. 7) at the vehicle door mirror device 90 are respectively different than the retraction angle (θ5 in FIG. 6) and the forward retraction angle (θ6 in FIG. 6) at the vehicle door mirror device 80 (for the right side of a left-handle vehicle). (Namely, θ7>θ5 and θ8<θ6.) Thus, at the stand 94 of the vehicle door mirror device 90, a pair of stand hills 95 and a pair of stand valleys 96 (each including one end portion 96A and another end portion 96B) are provided so as to correspond to the extended position and the retracted position of the mirror 52 for the left side of a left-handle vehicle, and to the case hills 32. Further, at the stand 94 of the vehicle door mirror device 90, a stand projection 98 is provided so as to correspond to the forwardly retracted position of the mirror 52 for the left side of a left-handle vehicle, and to the case projections 36.

Next, operation of the present embodiment will be described.

In the vehicle door mirror devices 10, 50, 80, 90 having the above-described structures, the retracting mechanisms 22, 68, 82, 92 have the stands 26, 64, 84, 94 provided at the door (not shown) of a vehicle and the case members 24 mounted to the frames 18, 58. Due to the case members 24 being rotated with respect to the stands 26, 64, 84, 94 by the retracting mechanisms 22, 68, 82, 92, the mirrors 12, 52 are rotated in the one direction (the direction of arrow A) or in the other direction (the direction of arrow B).

When the mirrors 12, 52 are, as described above, rotated in the one direction by the retracting mechanisms 22, 68, 82, 92 from the extended position (the position at which one end portions of the case hills 32 provided at the case members 24 abut the one end portions 42A, 72A, 86A, 96A of the stand valleys 42, 72, 86, 96 provided at the stands 26, 64, 84, 94), the other end portions of the case hills 32 abut the other end portions 42B, 72B, 86B, 96B of the stand valleys 42, 72, 86, 96. The mirrors 12, 52 are thereby stopped at the retracted position. On the other hand, when the mirrors 12, 52 are rotated from the retracted position in the other direction by the retracting mechanisms 22, 68, 82, 92 as described above, the one end portions of the case hills 32 abut the one end portions 42A, 72A, 86A, 96A of the stand valleys 42, 72, 86, 96, and the mirrors 12, 52 are thereby stopped at the extended position.

Moreover, when the case members 24 receive an external force of a predetermined value or greater in the other direction due to the door mirror visors 14, 54 receiving an external force, the case hills 32 ride up on the one end portions 42A, 72A, 86A, 96A of the stand valleys 42, 72, 86, 96. Rotation of the mirrors 12, 52 toward the forwardly retracted position is thereby permitted. In this way, when the mirrors 12, 52 are rotated toward the forwardly retracted position, the case projections 36 provided at the case members 24 abut the stand projections 44, 74, 88, 98 provided at the stands 26, 64, 84, 94, such that the mirrors 12, 52 are stopped at the forwardly retracted position.

Here, at the vehicle door mirror devices 10, 50, 80, 90, the brackets 16, 56 are divided into the frames 18, 58, which hold the mirrors 12, 52, and the case members 24, which are supported rotatably at the stands 26, 64, 84, 94. Thus, even if the left and right of the case members 24 are reversed, the left and right of the frames 18, 58 are not reversed. Therefore, the frames 18, 58 can be provided separately for the right side of a vehicle and for the left side of a vehicle, and the frame 18 for the right side of a vehicle and the frame 58 for the left side of a vehicle can hold the mirrors 12, 52 at the vehicle rear sides thereof.

The mounting holes 23 (the regions mounted to the screw holes 19, 59 of the frames 18, 58) and the supporting holes 30 (the regions supported rotatably at the supporting shafts 38, 66 of the stands 26, 64, 84, 94) of the case members 24 are provided to be symmetrical with respect to the vertical plane H (the vertical plane which is substantially parallel to the frames 18, 58 and which passes through the transverse direction centers of the case members 24). As a result, even if the same case member 24 is used for the right side of a vehicle and for the left side of a vehicle by its left and right sides being reversed, the screw holes 19 of the frame 18 for the vehicle right side and the screw holes 59 for the frame 58 for the vehicle left side can be mounted at the mounting holes 23 of the case members 24 by the screws (not shown). Further, the case members 24 can be supported at the supporting holes 30 by the supporting shafts 38 of the stands 26, 84 for the right side of a vehicle and the supporting shafts 66 of the stands 64, 94 for the left side of a vehicle.

The pair of positioning projections 25 of the case member 24 are provided symmetrically with respect to the vertical plane H. As a result, even if the same case member 24 is used for the right side of a vehicle and for the left side of a vehicle by its left and right sides being reversed, the case member 24 for the vehicle right side can be positioned at the anchor plate 15 (the anchor hole 17) for the vehicle right side and the frame 18 (the positioning hole 21), and the case member 24 for the vehicle left side can be positioned at the anchor plate 55 (the anchor hole 57) for the vehicle left side and the frame 58 (the positioning hole 61).

In this way, the frame 18 for the vehicle right side and the frame 58 for the vehicle left side can hold the mirrors 12, 52 at the vehicle rear sides thereof. The common case member 24 can be mounted to the frame 18 for the vehicle right side and to the frame 58 for the vehicle left side. The common case member 24 can be supported by the stands 26, 84 for the vehicle right side and the stands 64, 94 for the vehicle left side. Further, the common case member 24 can be positioned at the anchor plate 15 and the frame 18 for the vehicle right side and at the anchor plate 55 and the frame 58 for the vehicle left side. Therefore, a common case member 24 can be used for the case member 24 for the vehicle right side and the case member 24 for the vehicle left side.

In this way, mistakes in assembling the case member 24 at the stand 26 for the vehicle right side (the stand 84 for the vehicle right side) and the stand 64 for the vehicle left side (the stand 94 for the vehicle left side) can be prevented. Work for assembling the case member 24 to the stands 26, 64, 84, 94 is facilitated, and the assemblability of the retracting mechanisms 22, 68, 82, 92 can be improved.

Further, the case hills 32 and the case projections 36 of the case member 24 are provided so as to be symmetrical with respect to the vertical plane H. As a result, even if the common case member 24 is used for the right side of a vehicle and for the left side of a vehicle by its left and right sides being reversed, the case hills 32 and the case projections 36 are disposed at positions which are substantially symmetrical to the left and the right at the case member for the vehicle right side and the case member 24 for the vehicle left side. In this way, the case member 24 for the vehicle right side and the case member 24 for the vehicle left side can be used in common.

Moreover, the both end portions (the one end portions 42A, 72A, 86A, 96A and the other end portions 42B, 72B, 86B, 96B) of the stand valleys 42, 72, 86, 96 of the stands 26, 64, 84, 94 project toward the case member 24 so as to correspond to the extended positions and the retracted positions of the mirrors 12, 52. Thus, as in the present embodiment, when there is a difference between the angles of retraction of the mirror 12 for the right side of a right-handle vehicle, the mirror 52 of the left side of a right-handle vehicle, the mirror 12 for the right side of a left-handle vehicle, and the mirror 52 for the left side of a left-handle vehicle (i.e., when θ1 and θ5, and θ3 and θ7 differ), even if the common case member 24 (the case hills 32) is used for the right side of a right-handle vehicle, for the left side of a right-handle vehicle, for the right side of a left-handle vehicle and for the left side of a left-handle vehicle, the four types of stand valleys 42, 72, 86, 96 are set for the right side of a right-handle vehicle, for the left side of a right-handle vehicle, for the right side of a left-handle vehicle and for the left side of a left-handle vehicle. Thus, the mirrors 12, 52 for the right side of a right-handle vehicle, for the left side of a right-handle vehicle, for the right side of a left-handle vehicle and for the left side of a left-handle vehicle can be stopped at the respective retracted positions and extended positions.

Moreover, the stand projections 44, 74, 88, 98 of the stands 26, 64, 84, 94 project toward the case member 24 so as to correspond to the forwardly retracted positions of the mirrors 12, 52. Thus, as in the present embodiment, when there is a difference between the forward retraction angles of the mirror 12 for the right side of a right-handle vehicle, the mirror 52 for the left side of a right-handle vehicle, the mirror 12 for the right side of a left-handle vehicle, and the mirror 52 for the left side of a left-handle vehicle (i.e., when θ2 and θ6, and θ4 and θ8 differ), even if the common case member 24 (the case projections 36) is used for the right side of a right-handle vehicle, for the left side of a right-handle vehicle, for the right side of a left-handle vehicle and for the left side of a left-handle vehicle, the four types of stand projections 44, 74, 88, 98 are set for the right side of a right-handle vehicle, for the left side of a right-handle vehicle, for the right side of a left-handle vehicle and for the left side of a left-handle vehicle. Thus, the mirrors 12, 52 for the right side of a right-handle vehicle, for the left side of a right-handle vehicle, for the right side of a left-handle vehicle and for the left side of a left-handle vehicle can be stopped at the respective forward retracted positions.

In this way, the mirrors 12, 52 for the right side of a right-handle vehicle, for the left side of a right-handle vehicle, for the right side of a left-handle vehicle and for the left side of a left-handle vehicle can be stopped at the respective retracted positions, extended positions and forward retracted positions. Thus, the common case member 24 can be used as the case member 24 for the right side of a right-handle vehicle, the case member 24 for the left side of a right-handle vehicle, the case member 24 for the right side of a left-handle vehicle and the case member 24 for the left side of a left-handle vehicle.

Accordingly, mistakes in assembling the case members 24 to the stands 26, 64, 84, 94 for the right side of a right-handle vehicle, for the left side of a right-handle vehicle, for the right side of a left-handle vehicle and for the left side of a left-handle vehicle, can be prevented. The work for assembling the case members to the stands is made even more easy, and the assemblability of the retracting mechanism can be improved even more.

In the present embodiment, the holding portions 20, 60 cannot be assembled to the side surfaces at the vehicle front sides of the frames 18, 58. However, a structure is possible in which the holding portions can be assembled to the vehicle front side surfaces of the frames. With such a structure, a common frame can be used for the frame for the right side of a right-handle vehicle, the frame for the left side of a right-handle vehicle, the frame for the right side of a left-handle vehicle, and the frame for the left side of a left-handle vehicle.

What is claimed is:

1. A door mirror system for a vehicle, which applies to each of four aspects which are a right side of a vehicle in which a steering wheel is disposed at a right side, a left side of a vehicle in which a steering wheel is disposed at a right side, a right side of a vehicle in which a steering wheel is disposed at a left side, and a left side of a vehicle in which a steering wheel is disposed at a left side, the vehicle door mirror device comprising:

a mirror by which a region at a rear of a vehicle can be viewed;

a bracket which holds the mirror;

a stand which is fixed to a vehicle body and which rotatably supports the bracket between an extended position, at which the mirror enables viewing of the region at the rear of the vehicle, and a retracted position, wherein four types of the stand are provided, one type of stand being provided for each of the four aspects;

the bracket is formed by a frame to which the mirror is mounted and which holds the mirror, and a case member which is rotatably supported at the stand and which is mounted to the frame, and two types of the frame are provided, one type of frame being provided for a right side of a vehicle and one type of frame being provided for a left side of a vehicle, and the case member is used in common for each of the four types of stands; and by selectively combining, in accordance with the respective four aspects, one of the four types of stands and one of the two types of frames, the vehicle door mirror system applies to each of the four aspects.

* * * * *